US007657924B2

(12) United States Patent
Hondo et al.

(10) Patent No.: US 7,657,924 B2
(45) Date of Patent: Feb. 2, 2010

(54) METHOD AND SYSTEM FOR IMPLEMENTING AUTHORIZATION POLICIES FOR WEB SERVICES

(75) Inventors: Maryann Hondo, Arlington, MA (US); Anthony J. Nadalin, Austin, TX (US); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 10/907,577

(22) Filed: Apr. 6, 2005

(65) Prior Publication Data

US 2006/0230430 A1 Oct. 12, 2006

(51) Int. Cl.
*H04L 9/00* (2006.01)

(52) U.S. Cl. .......................................................... 726/1

(58) Field of Classification Search ..................... 726/1, 726/2, 4, 26, 30, 21, 27, 28, 29; 713/168, 713/170

See application file for complete search history.

(56) References Cited

U.S. PATENT DOCUMENTS

2003/0135628 A1 7/2003 Fletcher et al.
2003/0163513 A1 8/2003 Schaeck et al.
2003/0172110 A1 9/2003 Kunisetty
2003/0204622 A1 10/2003 Blizniak et al.
2003/0220925 A1 11/2003 Lior
2004/0054690 A1 3/2004 Hillerbrand et al.
2004/0064548 A1* 4/2004 Adams et al. ............... 709/224
2004/0093515 A1* 5/2004 Reeves, Jr. .................. 713/201
2004/0133656 A1 7/2004 Butterworth et al.
2004/0139319 A1 7/2004 Favazza et al.
2007/0124797 A1* 5/2007 Gupta et al. .................... 726/1

FOREIGN PATENT DOCUMENTS

WO 2004084522 A 9/2004

OTHER PUBLICATIONS

Bajaj et al. "Web Services Policy Attachment (WS-PolicyAttachment)", Sep. 2004.*
Blorusets et al. "Web Services Reliable Messaging Protocol (WS-ReliableMessaging)", Feb. 2005.*
IBM, "An introduction to Web Services Gateway", May 1, 2002.*
Kropiwiec, C.D. et al, "A Framework for Protecting Web Services with IPsec," Euromicro Conference, 2004. Proceedings. 30th Rennes, France, Aug. 31-Sep. 3, 2004, Pistacatawa, NJ, IEEE, Aug. 31, 2004, p. 290-297.

* cited by examiner

*Primary Examiner*—Beemnet W Dada
(74) *Attorney, Agent, or Firm*—Charles L. Moore; Moore & Van Allen, PLLC

(57) ABSTRACT

A method, system and computer program product for implementing authorization policies for web services may include defining an authorization policy for access to a web service. The method, system and computer program product may also include attaching the authorization policy to a service definition for the web service.

19 Claims, 4 Drawing Sheets

```
<wsp:PolicyAttachment>
        <wsp:AppliesTo>
                <wsp:Port URI = "http://www.fabrikam123.com/acct"
                                Type = "sap:InventoryPortType" />
        </wsp:AppliesTo>
        <wsp:PolicyReference URI="http://www.fabrikam123.com/acct-
authz-policy.xml"/>
</wsp:PolicyAttachment>
```

```
<wsp:Policy>
        <authzP:Allow wsp:Usage="wsp:Required"
           <wsp:OneOrMore>
                <role>
                        <name> Teller </name>
                </role>
                <role>
                        <name> Manager </name>
                </role>
                <wsp:OneOrMore>
            </authzP>
        <authzP:deny wsp:Usage="wsp:Required" />
                <role>
                        <name> Trainee </john>
                </role>
        </authzP>
<wsp:Policy>
```

METHOD AND SYSTEM FOR IMPLEMENTING AUTHORIZATION POLICIES FOR WEB SERVICES

BACKGROUND OF INVENTION

The present invention relates to web services or services provided over a network, such as the Internet or private network, and more particularly to a method and system for implementing authorization policies for web services.

Controlling access to services, such as web services or the like, offered via the Internet, private network or similar network to only authorized users may present challenges. This may be particularly challenging in the circumstance where a single Universal Resource Locator (URL) offers different services to multiple different groups of authorized users. In a Simple Object Process Protocol/HyperText Transfer Protocol (SOAP/HTTP) the URL corresponding to the HTTP binding may be protected. This may be appropriate protection where the URL only offers the web service to be protected but may not be sufficient in the case described above where multiple restricted access web services may be handled under the same URL.

The web service may be protected closer to the service implementation; for example, the Sun Microsystems™ Enterprise JavaBeans™ code utilized in association with a Java 2 Enterprise Edition (J2EE®) model may be protected using J2EE access security. Java, Enterprise JavaBeans and Sun Microsystems are trademarks of Sun Microsystems, Inc. in the United States, other countries or both. One issue with this type of security arrangement is that performing access control may be difficult when a gateway, proxy server or the like is involved. There may be various layers that may be able to perform access control which need to be handled consistently across the various layers.

BRIEF SUMMARY OF INVENTION

In accordance with an embodiment of the present invention, a method for implementing authorization policies for web services may include defining an authorization policy for access to a web service based a service definition (e.g., on a port or port type definition, binding, quality and functionality of a service, service name, message, etc). The method may also include attaching the authorization policy to the service definition for the web service.

In accordance with another embodiment of the present invention, a system for implementing authorization policies for web services may include a service definition for a web service. The system may also include an authorization policy for access to the web service attachable to the service definition.

In accordance with another embodiment of the present invention, a computer program product for implementing authorization policies for web services may include a computer readable medium having computer readable program code embodied therein. The computer readable medium may include computer readable program code configured to define an authorization policy for access to a web service. The computer readable medium may also include computer readable program code configured to attach the authorization policy to a service definition for the web service.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 3 is an example of a program or computer executable code in Web Service Description Language (WSDL) for attaching a policy to a port type in accordance with an embodiment of the present invention.

FIG. 4 is an example of a program or computer executable code in WSDL of an authorization policy file to define roles for different named individuals in accordance with an embodiment of the present invention.

DETAILED DESCRIPTION OF THE INVENTION

Figure 1:
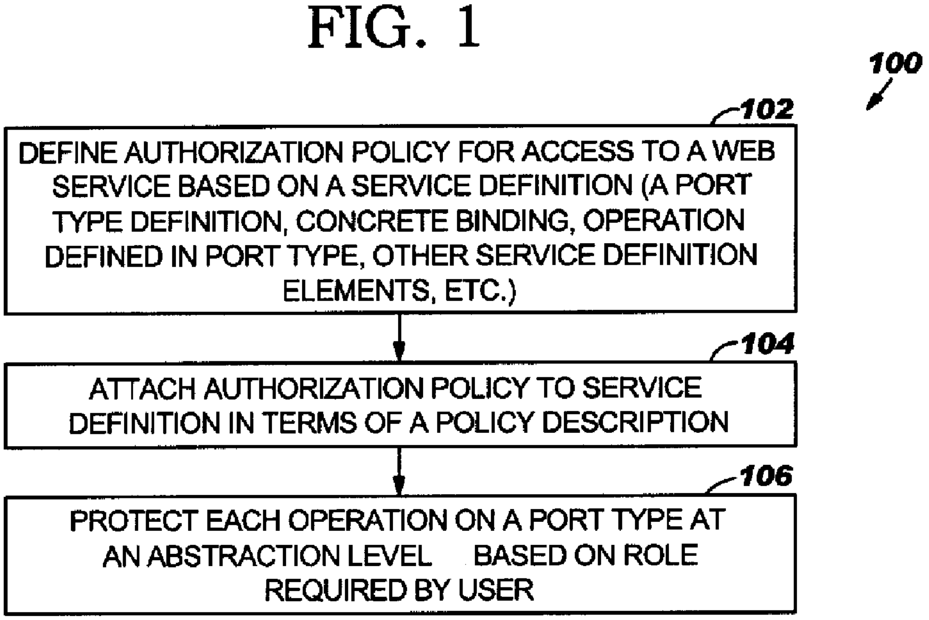
FIG. 1 is a flow chart of an example of a method for implementing an authorization policy for web services in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for implementing an authorization policy for web services in accordance with an embodiment of the present invention. In block 102, an authorization policy for access to a web service or the like may be defined. The authorization policy definition may be based on a service definition or the like. For instance, the authorization policy may be based on the concrete binding (e.g., URL), or operation defined in its port type, or other service definition elements that may be part of the WSDL definition or artifacts associated with WSDL, such as properties, metadata, etc. In block 104, the authorization policy may be attached to a service definition in terms of a policy description. In block 106, each operation on a port type may be protected at an abstraction level in terms of roles or based on a role required by the user. For example, an operation that may be called 'viewItinerary' on a travel service web site can be defined in terms of a 'TravelAgent' role so that the definition is abstract in terms of what makes up the permission. During deployment and based on the environment, further configuration can be done so that, the TravelAgent role may be assigned to an AgentGroup in a Lightweight Directory Access Protocol (LDAP) directory in a given travel agency.

Figure 2:
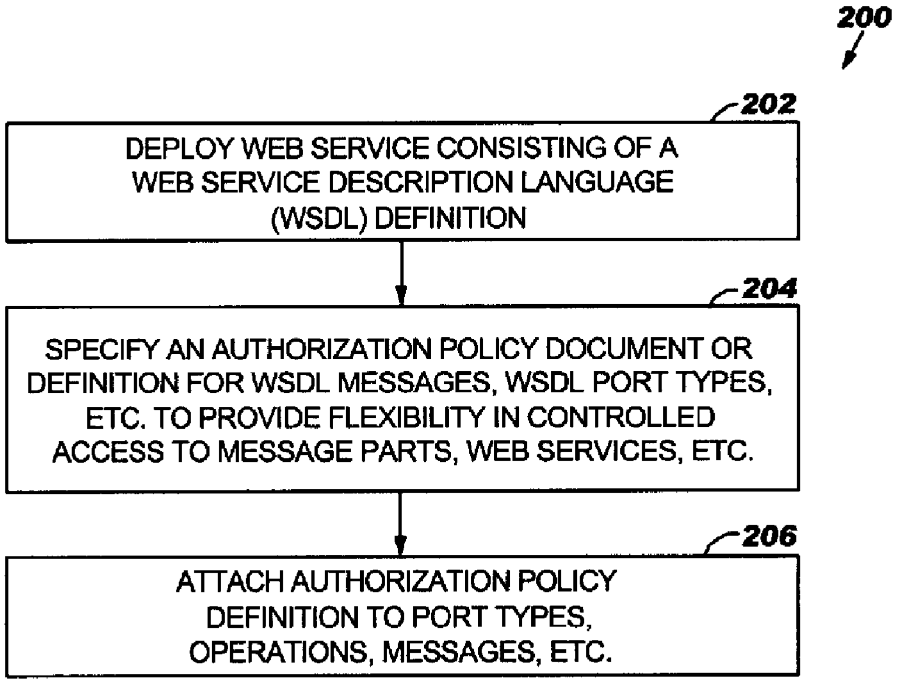
FIG. 2 is a flow chart of an example of a method for implementing an authorization policy for web services in accordance with another embodiment of the present invention.

FIG. 2 is a flow chart of an example of a method 200 for implementing an authorization policy for web services in accordance with another embodiment of the present invention. In block 202, a web service may be deployed consisting of a web service description language (WSDL) definition. In block 206, an authorization policy document or definition may be specified for access to WSDL messages, WSDL port types or the like. The authorization document or definition may provide flexibility in controlling access to message parts, web services or the like for fine grained access control, if needed. In block 206, the authorization policy definition may be attached to port types, operations, messages or the like. FIG. 3 is an example of a program or computer executable code 300 in WSDL for attaching a policy to a port type in accordance with an embodiment of the present invention.

To perform method level control of access to a WSDL service, policy document (acct-authz-policy.xml), the XML can have finer grained definitions. The authorization policy in that case, may refer to elements within a message, protocol or the like, so that the granularity is not only at the operation level but can be based on a given message or context during service invocation (e.g., time of the day, whether the service requestor is on a mobile device, in a secure location, or the like. To perform access control on the message itself, the message would refer to the policy documents. The references can end up pointing to authorization policy definitions. FIG. 4 is an example of a program or computer executable code 400 in WSDL of an authorization policy file to define roles for different named individuals in accordance with an embodiment of the present invention. Such definitions can be attached to either port types, operations, messages or the like depending upon the level of granularity or control required.

Figure 5:
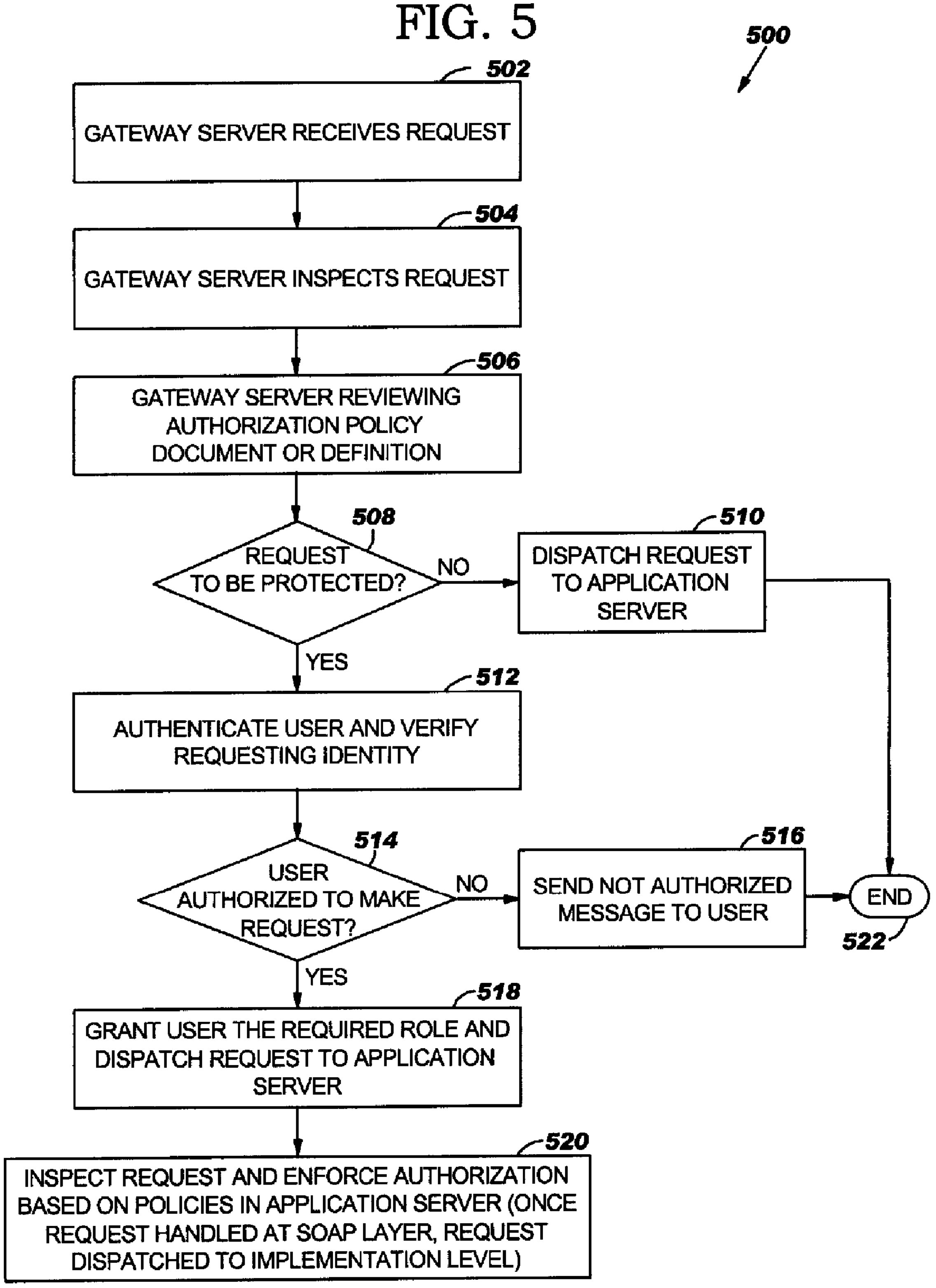
FIG. 5 is flow chart of an example of a method for implementing an authorization policy for web services in accordance with another embodiment of the present invention.

FIG. 5 is flow chart of an example of a method 500 for implementing an authorization policy for web services in accordance with another embodiment of the present invention. In block 502, a gateway server may receive a request for services. The web server may be a web services gateway, proxy server or the like. The request for services may be to perform a task, a transaction, to provide information or data or the similar operation. In block 504, the gateway server may inspect the request. The gateway server may inspect the request to determine if the request or the requester or user requires authorization in order to access the web services required to fulfill the request or the gateway server may inspect the request for other purposes.

In block 506, the gateway server may review an authorization policy document or definition. As previously discussed, the authorization policy document or definition may be attached to or associated with a port type, an operation, a message or the like associated with the request. In block 508, a determination may be made whether the request or access to the web services to fulfill the request is protected or access is limited to certain users. If the request or access to the web services is not protected or limited, the method 500 may advance to block 510. In block 510, the request may be dispatched to an appropriate application server to fulfill the request. The method 500 may then end at termination 522.

If the request or access to the web services is protected in block 508, the method 500 may advance to block 512. In block 512, the identity of the user may be authenticated and verified to insure that the user is authorized to access the web services needed to fulfill the request. In block 514, a determination may be made whether the user is authorized to make the request from block 512. If the user in not authorized to make the request, the method may advance to block 516. In block 516, a message may be sent to the user that in effect indicates that the user is not an authorized user and cannot access the web services to fulfill the request. The method 500 may then end at termination 522.

If the user is an authorized user in block 514, the method 500 may advance to block 518. In block 518, the user may be granted the required role to access the web services for fulfilling the request and the request may be dispatched to the appropriate application server to satisfy the request.

In block 520, the request or message may be inspected again and authorization to the web service may be enforced in the application server based on the policy documents or definitions that may be accessed by the application server. Once a request is handled at a SOAP level, the request may be dispatched to an implementation level and the request may be fulfilled and results returned to the user.

Figure 6:
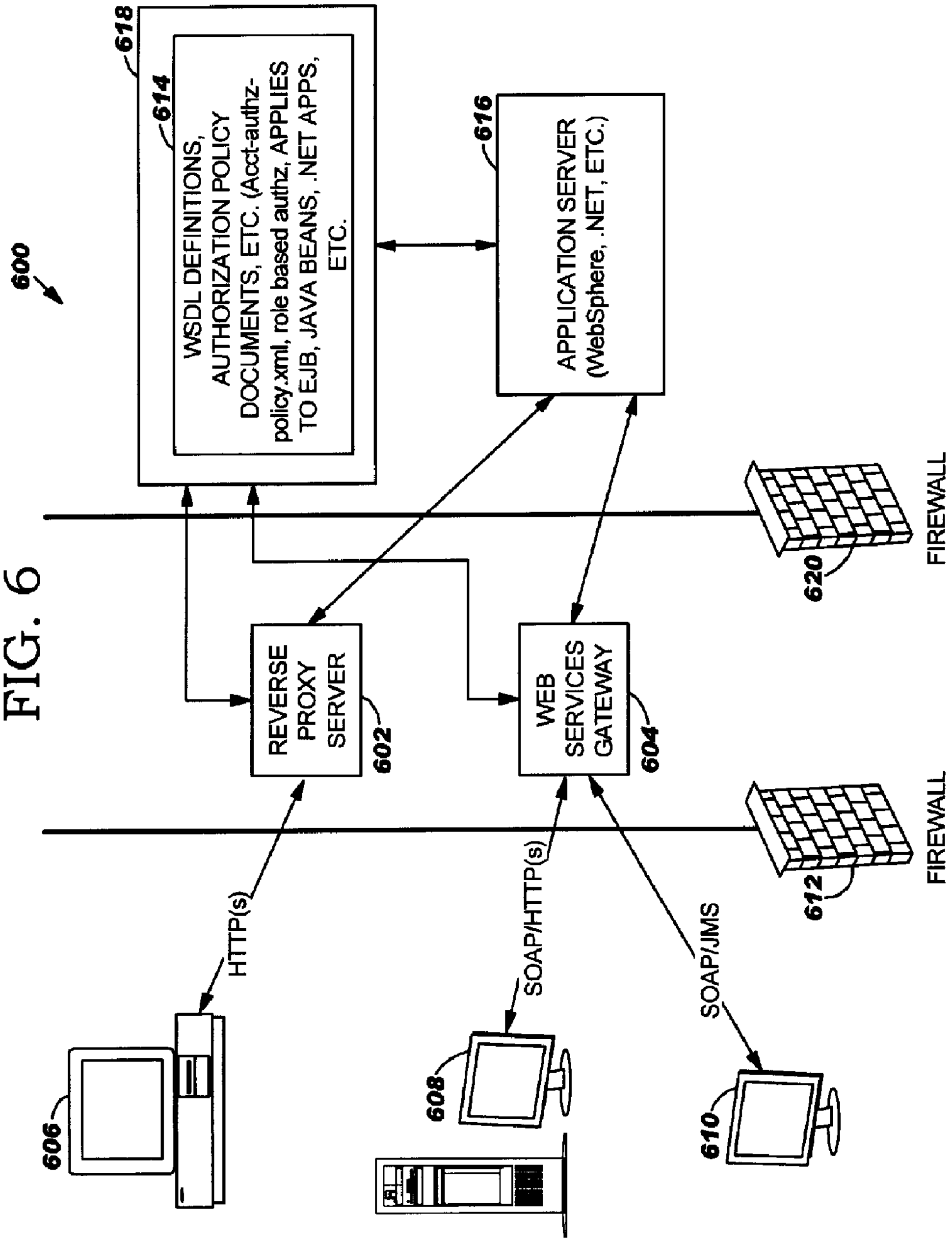
FIG. 6 is an exemplary system for implementing an authorization policy for web services in accordance with an embodiment of the present invention.

FIG. 6 is an exemplary system 600 for implementing an authorization policy for web services in accordance with an embodiment of the present invention. The system 600 may include one or more gateway servers, such as a reverse proxy server 602 and a web services gateway 604 or similar servers. The reverse proxy server 602 may be accessed by users 606 using HyperText Transfer Protocol (HTTP) or similar protocols. The web services gateway server 604 may be accessed by users 608 using SOAP/HTTP type protocols or the like and by users 610 that may utilize SOAP/Java Messaging Service (JMS) or similar protocols or services. A firewall 612 may be disposed between the users or clients 606-610 and the reverse proxy server 602 and web services gateway 604.

The reverse proxy server 602 and the web services gateway 604 may access authorization policies 614. As previously discussed, the authorization policies 616 may be WSDL definitions, authorization documents or the like. Examples of authorization policies may include Acct-authz-policy.xml, role based authz, and the like, and may be applicable to Enterprise JavaBeans®, .NET applications and similar applications. The reverse proxy server 602 or web services gateway 604 may review the appropriate authorization policy related to a request in response to receiving the request. The server 602 or gateway 604 may authenticate the user 606-610 making the request and verify the identity of the requesting user in response to the request being protected based on review of the authorization policy 614. The user 606-610 may be granted a required role for the request and the request may be dispatched to an application server 616 in response to the user 606-610 being authorized to make the request.

The application server 616 may provide a variety of functions. The application server 616 may serve as a central hub for running services such as message routing, object exchange, transaction processing, data transformation or other data processing functions. The application server 616 may also provide secure access to other servers, databases, networks or the like. The application server 616 may be an IBM WebSphere®, .NET or similar type application server or the like. WebSphere® is a registered trademark of the IBM Corporation in the United States, other countries or both. The application server 616 may receive requests dispatched from the reverse proxy server 602 or web services gateway 604 in response to the user 606-610 being authorized to make the request based on the authorization policies 614 for the web services being requested. The application server 616 may access the authorization policies 614 that may reside in a database or data source 618 that may be remote from the application server 616. The application server 616 may enforce authorization to utilize the web service requested based on the authorization policy 614 associated with the request or attached to the requested web service.

A firewall 620 may also be disposed between the application server 616 and the reverse proxy server 602 and web services gateway 604. The firewall 620 provides additional security for the system 600 along with firewall 612.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method executable on a server for implementing authorization policies for web services, the server executing the method to perform:

attaching an authorization policy to a service definition for a web service, the authorization policy defining access to the web service based on a service definition;

reviewing the authorization policy in response to receiving a request;

authenticating a user and verifying a requesting identity of the user in response to the request being protected based on reviewing the authorization policy;

specifying an authorization policy document for each message, operation and port type to control access to message parts and the web service; and attaching an authorization policy definition to each port type, operation and message.

2. A system for implementing authorization policies for web services, comprising:

a gateway server adapted to review an authorization policy in response to receiving a request for a web service from a user, the authorization policy for access to the web service attachable to a service definition for the web service, the gateway server further being adapted to specify an authorization policy document for each message, operation and port type to control access to message parts and the web service and attach an authorization policy definition to each port type, operation and message; and an application server adapted to receive the request in response to the user being authorized to make the request and adapted to enforce authorization to use the web services based on the authorization policy.

3. A computer program product comprising a computer readable storage medium, the computer readable storage medium having computer readable program code stored therein for implementing authorization policies for web services, the computer readable medium comprising:

computer readable program code configured to attach the authorization policy to a service definition for the web service:

computer readable program code configured to review the authorization policy in response to a gateway server receiving a request;

computer readable program code configured to authenticate the user and verifying a requesting identity in response to the request being protected based on reviewing the authorization policy;

computer readable program code configured to specify an authorization policy document for each message, operation and port type to control access to message parts and the web service; and computer readable program code configured to attach an authorization policy definition to each port type, operation and message.

4. The method according to claim 1, further comprising granting the user a required role.

5. The method according to claim 1, further comprising dispatching the request to an application server in response to the user being authorized to make the request allowing the application server to enforce authorization to utilize the web service in the application server based on the authorization policy.

6. The system according to claim 2, further comprising the gateway server being adapted to authenticate the user and verify a requesting identity in response to the request being protected based on the review of the authorization policy.

7. The system according to claim 2, wherein the gateway server grants the user a required role and to dispatch the request to the application server in response to the user being authorized to make the request.

8. The computer program product according to claim 3, further comprising computer readable program code configured to define an authorization policy for access to a web service.

9. The computer program product according to claim 3, further comprising computer readable program code configured to grant the user a required role and dispatch the request to an application server in response to the user being authorized to make the request.

10. The computer program product according to claim 3, further comprising computer readable program code configured to enforce authorization to utilize the web service in the application server based on the authorization policy.

11. The method according to claim 1, further comprising protecting each operation on a port type at an abstraction level based on a role of a user.

12. The method according to claim 1, further comprising reviewing an authorization policy in response to a gateway server receiving a request.

13. The method according to claim 1, further comprising enforcing authorization to utilize the web service in the application server based on the authorization policy.

14. The system according to claim 2, further comprising the gateway server being adapted to protect each operation on a port type at an abstraction level based on a role of a user.

15. The system according to claim 2, further comprising the gateway server being adapted to review an authorization policy in response to the gateway server receiving a request.

16. The system according to claim 2, further comprising the gateway server being adapted to enforce authorization to utilize the web service in the application server based on the authorization policy.

17. The computer program product according to claim 3, further comprising computer readable program code configured to protect each operation on a port type at an abstraction level based on a role of a user.

18. The computer program product according to claim 3, further comprising computer readable program code configured to review an authorization policy in response to a gateway server receiving a request.

19. The computer program product according to claim 3, further comprising computer readable program code configured to enforce authorization to utilize the web service in the application server based on the authorization policy.

* * * * *

UNITED STATES PATENT AND TRADEMARK OFFICE

CERTIFICATE OF CORRECTION

PATENT NO. : 7,657,924 B2
APPLICATION NO. : 10/907577
DATED : February 2, 2010
INVENTOR(S) : Hondo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Thirtieth Day of November, 2010

David J. Kappos

*Director of the United States Patent and Trademark Office*